(12) United States Patent
Schwarz et al.

(10) Patent No.: US 10,243,224 B2
(45) Date of Patent: Mar. 26, 2019

(54) METHOD FOR SWITCHING OFF A FUEL CELL STACK, AND FUEL CELL SYSTEM

(71) Applicant: Audi AG, Ingolstadt (DE)

(72) Inventors: Torsten Schwarz, Wasbüttel (DE); Johannes Müller, Uetze (DE); Matthew Kenneth Hortop, Braunschweig (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 15/531,358

(22) PCT Filed: Nov. 9, 2015

(86) PCT No.: PCT/EP2015/076028
§ 371 (c)(1),
(2) Date: May 26, 2017

(87) PCT Pub. No.: WO2016/083104
PCT Pub. Date: Jun. 2, 2016

(65) Prior Publication Data
US 2017/0331128 A1    Nov. 16, 2017

(30) Foreign Application Priority Data

Nov. 26, 2014   (DE) .................. 10 2014 224 135

(51) Int. Cl.
| | | |
|---|---|---|
| *H01M 8/04* | (2016.01) | |
| *H01M 8/04303* | (2016.01) | |
| *H01M 8/04955* | (2016.01) | |
| *H01M 8/04089* | (2016.01) | |

(Continued)

(52) U.S. Cl.
CPC ... *H01M 8/04303* (2016.02); *H01M 8/04089* (2013.01); *H01M 8/04111* (2013.01);
(Continued)

(58) Field of Classification Search
CPC ......... H01M 8/04303; H01M 8/04111; H01M 8/04753; H01M 2008/1095;
(Continued)

(56) References Cited

U.S. PATENT DOCUMENTS

| | | |
|---|---|---|
| 2008/0145716 A1 | 6/2008 | Yu et al. |
| 2011/0111314 A1* | 5/2011 | Cui ........................... C01B 3/38 |
| | | 429/417 |
| 2011/0143241 A1 | 6/2011 | Tighe et al. |

FOREIGN PATENT DOCUMENTS

| | | |
|---|---|---|
| DE | 10 2007 059 999 A1 | 7/2008 |
| DE | 10 2010 053 632 A1 | 6/2011 |

(Continued)

*Primary Examiner* — Anthony R. Jimenez
(74) *Attorney, Agent, or Firm* — Seed IP Law Group LLP

(57) ABSTRACT

The invention relates to a method for switching off a fuel cell system (100) having
a fuel cell stack (10), that has anode chambers (13) and cathode chambers (12), and
a cathode supply (20) having a cathode supply path (21) for supplying an oxygenated cathode operating gas into the cathode chambers (12), a compressor (23) arranged in the cathode supply path (21) and a cathode exhaust path (22) for discharging a cathode exhaust gas from the cathode chambers (12).
The method comprises the steps of:
(a) Maintenance of the cathode chambers (12) under excess pressure while preventing a flow of cathode operating gas through the cathode chambers (12) while keeping the cathode operating gas that is present in the cathode chambers (12) oxygen-depleted;
(b) Expansion of the oxygen-depleted cathode operating gas present in the cathode chambers (12) via the cathode supply path (31) [sic] and/or the cathode exhaust path (22), and (Continued)

Figure 1:
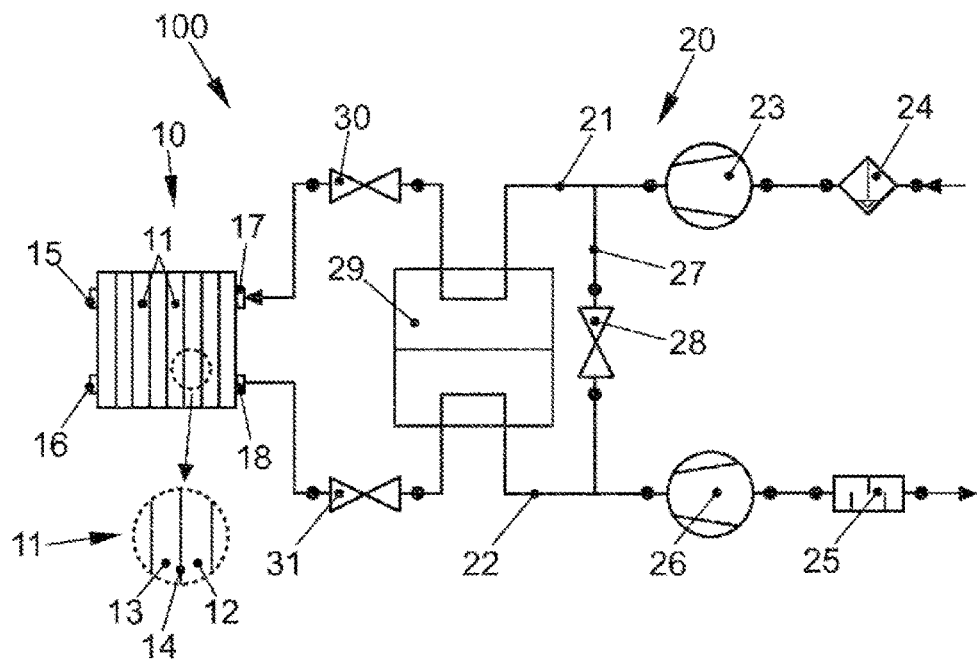

(c) Separation of the cathode chambers (12) from the environment.

18 Claims, 3 Drawing Sheets

(51) Int. Cl.
  *H01M 8/04223*  (2016.01)
  *H01M 8/0438*   (2016.01)
  *H01M 8/0444*   (2016.01)
  *H01M 8/04746*  (2016.01)
  *H01M 8/04791*  (2016.01)
  *H01M 8/04111*  (2016.01)
  *H01M 8/04119*  (2016.01)
  *H01M 8/04537*  (2016.01)
  *H01M 8/1018*   (2016.01)

(52) U.S. Cl.
  CPC ... *H01M 8/04223* (2013.01); *H01M 8/04395* (2013.01); *H01M 8/04455* (2013.01); *H01M 8/04753* (2013.01); *H01M 8/04761* (2013.01); *H01M 8/04798* (2013.01); *H01M 8/04805* (2013.01); *H01M 8/04955* (2013.01); *H01M 8/04126* (2013.01); *H01M 8/04552* (2013.01); *H01M 2008/1095* (2013.01)

(58) Field of Classification Search
  CPC ......... H01M 8/04089; H01M 8/04395; H01M 8/04455; H01M 8/04761; H01M 8/04798; H01M 8/04805; H01M 8/04955; H01M 8/04126; H01M 8/04552
  USPC ................................................ 429/446, 429
  See application file for complete search history.

(56) References Cited

FOREIGN PATENT DOCUMENTS

| | | | |
|---|---|---|---|
| DE | 10 2011 119 665 A1 | 5/2013 |
| DE | 10 2012 018 875 A1 | 3/2014 |
| DE | 10 2012 023 799 A1 | 6/2014 |

* cited by examiner

METHOD FOR SWITCHING OFF A FUEL CELL STACK, AND FUEL CELL SYSTEM

The invention relates to a method for switching off a fuel cell system having a fuel cell stack as well as a fuel cell system used for implementing the method.

Fuel cells use the chemical conversion of a fuel with oxygen into water in order to generate electrical energy. Fuel cells contain the so-called membrane electrode assembly (MEA), which is a combination of an ion-conducting (usually proton-conducting) membrane and an electrode (anode and cathode) on each side of the membrane. In addition, gas diffusion layers (GDL) can be arranged on both sides of the membrane electrode assembly on the sides of the electrodes facing away from the membrane. Between the individual membrane electrode assemblies, bipolar plates (also called flow field plates) are usually arranged, which ensure a supply of the individual cells with the operating media, i.e. the reactants, and are usually also used for cooling. In addition, the bipolar plates ensure an electrically conductive contact to the membrane electrode assemblies. Generally, the fuel cell is constituted by a plurality of MEAs arranged in the stack, the electrical power outputs of which MEAs accumulate.

During operation of a polymer electrolyte membrane (PEM) fuel cell, the fuel, especially hydrogen $H_2$ or a gas mixture containing hydrogen is supplied over an open flow field of the bipolar plate on the anode side to the anode, where electrochemical oxidation of $H_2$ to $H^+$ with loss of electrons takes place. Via the electrolyte or the membrane, which separates the reaction chambers gas-tightly from one another and electrically insulates them, the protons $H^+$ are transported from the anode chamber into the cathode chamber (in a water-bound or water-free manner). The electrons provided at the anode are guided to the cathode via an electrical line. The cathode receives oxygen or a gas mixture containing oxygen (such as air) via an open flow field of the bipolar plate on the cathode side, so that a reduction of $O_2$ to $O^{2-}$ with gain of electrons takes place. At the same time, the oxygen anions react in the cathode chamber with the protons transported via the membrane to form water.

In order to supply a fuel cell stack with its operating media, i.e. the reactants, said stack comprises on the one hand an anode supply and on the other hand a cathode supply. The anode supply comprises an anode supply path for supplying an anode operating gas to the anode chambers and an anode exhaust path for discharging an anode exhaust gas from the anode chambers. Similarly, the cathode supply includes a cathode supply path for feeding a cathode operating gas into the cathode chambers and a cathode exhaust path for discharging a cathode exhaust gas from the cathode chambers of the fuel cell stack.

After a shutdown of a fuel cell stack, a penetration of atmospheric oxygen into the anode chambers of the fuel cell stack takes place that, when the system is restarted, the so-called air-air start, can lead to a significant alteration of the fuel cells as a result of carbon corrosion as well as oxide formation in the catalytic materials because of the resulting high electrical potentials. In order to prevent these effects, the stack is switched off if possible without oxygen during the shutdown, so that, after a short time, a gas mixture of hydrogen, nitrogen and water vapor is formulated as a result of diffusion processes on the anode as well as the cathode side that protects the stack when restarted. In this state, oxygen diffuses into the stack and catalytically reacts with the hydrogen that is present while consuming it.

A known strategy for removing oxygen from the cathode chambers provides for flooding these with fuel, hydrogen in particular, via a flushing line after shutting off the air supply that, on one hand, displaces the air and, on the other, reacts with the remaining oxygen and thus chemically binds it. For this conversion, the hydrogen and oxygen must be brought together on the catalytic material of the cathode. It is disadvantageous that the reaction of the hydrogen with the oxygen in the cathode chambers partially takes place in a diffusion-controlled manner and thus relatively slowly. The conversion of the oxygen furthermore requires a stoichiometric quantity of hydrogen and thus increases the total consumption of hydrogen.

DE 10 2012 023 799 A1 describes a method for switching off a fuel cell system, in which a negative pressure is applied to the anode and/or cathode side after turning off the electrical power drain from the fuel cell in order to dry the fuel cell, and the anode and/or cathode side is subsequently filled with fuel in order to avoid an ingress of oxygen during the idle state. In order to produce the negative pressure on the cathode side, a vacuum pump of a brake booster is used, which vacuum pump is connected on the suction side to a negative-pressure line, which connects the cathode and anode exhaust gas lines to one another.

DE 10 2011 119 665 A1 describes a fuel cell system, in which a gas jet pump functioning according to the Venturi principle is arranged in the cathode exhaust gas line, to the pressure input side of which pump is applied the cathode exhaust air and the suction side of which pump is connected to a discharge pressure line connected to the anode exhaust gas line. If the system is to be prepared for a restart of the fuel cell, a negative pressure is generated in the anode chambers by means of the gas jet pump in order to remove water from said anode chambers. The water is guided to the cathode exhaust gas (exhaust air) via the discharge pressure line and the gas jet pump.

Also known are shutdown strategies in which the consumption of oxygen is accomplished via a fuel cell reaction, that is, by protons passing through the membrane.

DE 102012018875 A1 discloses a fuel cell system in which at least one passive valve device is arranged in the air supply and/or exhaust line that automatically opens and closes depending upon the air flow. This valve device serves to isolate the fuel cell cathode chambers from the environment whenever the fuel cell system is not in operation. Oxygen influx into the cathode chamber, as a result of wind effects, convection effects or the like, is thus prevented. In this manner, as oxygen-free a condition as possible, which is produced during a shutdown of the fuel cell system by the consumption of residual oxygen in the fuel cell, is maintained for as long as possible.

DE 10 2007 059 999 A1 discloses a method for switching off a fuel cell stack, wherein a primary electrical consumer that is supplied with electricity created by the fuel cell stack is first disconnected from the fuel cell stack. The air flow into the cathode side is then suppressed and hydrogen overpressure on the anode side is maintained. The fuel cell stack is short-circuited, and consumption of oxygen on the cathode side by hydrogen on the anode side is allowed. Input and output valves on the anode and cathode sides are next closed, thus completing the shutdown.

The disadvantage of the above method is that, when switching the fuel cell stack off, the oxygen is only consumed in the active area of the individual cells, but not in the supply areas of the cells and in the line system of the cathode supply. Therefore, oxygen in the cells continues to diffuse into the cells after the system has been switched off. The duration of protection during the storage period is thus comparatively low.

The invention is now based on the object of providing a method for switching off a fuel cell system that extends the duration of protection after the shutdown via an oxygen-depleted gas mixture. The method should be implementable at low expense.

These objects are achieved by a method for switching off a fuel cell system having the features of the independent claims, as well as a fuel cell system suitable for executing the method.

The method according to the invention is designed for a fuel cell system that includes a fuel cell stack, which has cathode chambers and anode chambers, as well as a cathode supply including a cathode supply path for supplying an oxygenated cathode operating gas to the cathode chambers, a compressor arranged in the cathode supply path, as well as a cathode exhaust path for discharging a cathode exhaust gas from the cathode chambers. The method according to the invention for switching off such a fuel cell system includes the steps:

(a) Maintenance of the cathode chamber under excess pressure preventing a flow of cathode operating gas through the cathode chamber while keeping the cathode operating gas that is present in the cathode chambers oxygen-depleted;

(b) Expansion of the oxygen-depleted cathode operating gas present in the cathode chambers via the cathode supply path and/or the cathode exhaust path, and (c) Separation of the cathode chambers from the environment.

In particular, the step according to the invention of expanding the oxygen-depleted cathode operating gas causes a volumetric expansion of the same within the cathode supply path in the direction of an air intake and/or of the cathode exhaust path in the direction of the exhaust discharge. In this manner, the time elapsed before the oxygenated gas in the cathode chambers of the fuel cell stack is diffused, meaning the period of protection provided by the created inert gas atmosphere, is extended. By inhibiting penetration of oxygen into the cathode chambers during system shutdown, the diffusion of oxygen through the polymer electrolyte membrane into the anode chambers of the stack is prevented. Even after a comparatively long shutdown period, the fuel cell stack is thus protected against a damaging air-air start, in which oxygen is present on the anode side as well as the cathode side of the stack. The expansion of the oxygen-depleted gas mixture additionally minimizes a possible residual concentration of oxygen in the mixture.

As a result, the service life of the fuel cell system and the life span of the system are extended.

The fuel cell system preferably has a first adjusting means arranged in the cathode supply path and/or a second adjusting means arranged in the cathode exhaust path. The adjusting means can be designed as valves or flaps, wherein the valves and flaps can be designed to be adjustable. Because adjusting means of this sort are already present in many fuel cell systems, the adjusting means do not increase the complexity of the system.

Step (a)

In a preferred embodiment of the method according to the invention, step (a) includes separating the cathode chambers from the environment. This can take place, in particular, by closing a first and/or second adjusting means in the cathode supply path or the cathode exhaust path. The operating pressure in the cathode chambers that occurs during normal operation of the fuel cell system is maintained by such a separation of the cathode chambers from the environment. Typically, the pressure in the cathode chambers of the fuel cell system is 150 to 250 kPa (1.5 to 2.5 bar) (absolute pressure). This pressure level is then preserved by separating the cathode chambers from the environment so that, at this pressure level, the oxygen content is reduced by abreaction.

In a preferred embodiment, step (a) includes the following substeps:

(a1) closing the first adjusting means arranged in the cathode exhaust path while the compressor is running and then (a2) closing the second adjusting means arranged in the cathode supply path.

In this context, it advantageous if the cathode gas supply includes a so-called wastegate line, which branches from the cathode exhaust path downstream of the compressor and discharges into the cathode exhaust path (downstream of the first adjusting means). The wastegate line is thus opened in step (a1) while the compressor is operating. In this manner, the compressor supplies pressure to the cathode chambers and transports the compressed cathode gas via the wastegate line into the exhaust path. Pressure is thus maintained in the cathode chambers without, however, causing cathode operating gas to flow through the cathode chambers.

The oxygen depletion of the cathode operating gases present in the cathode chambers during step (a) preferably takes place by a reaction of oxygen with fuel, in particular by generating water. This is accomplished especially preferably using the fuel present in the anode chambers, in particular hydrogen, which is catalytically decomposed into protons $H^+$, which then diffuse through the polymer electrolyte membrane into the cathode chamber and react there with the hydrogen to form water. This is thus the normal fuel cell reaction. It is advantageous for this purpose to maintain a combustible atmosphere in the anode chambers of the fuel cell stack during step (a). This can be accomplished by the fuel cell supply into the anode chambers first being maintained or by the anode chambers filled with fuel being separated from the environment. In an alternative embodiment, oxygen depletion is accomplished by direct introduction of fuel into the cathode chambers of the fuel cell stack. The supplied fuel can be taken from the fuel tank of the anode supply or from the anode exhaust, which usually contains otherwise unused fuel.

Step (a) is preferably maintained until a desired oxygen concentration is achieved in the cathode chambers. For this purpose, it is possible to specify and wait through a predetermined time period. Alternately, the oxygen concentration in the cathode gas can be determined, for example, using an oxygen-sensitive gas sensor or indirectly by detection of cell voltage. Step (a) is terminated if the predetermined time period has elapsed or the minimum oxygen concentration or a lower cell voltage threshold is reached.

Step (b)

After completion of step (a), meaning after having achieved a desired oxygen depletion in the cathode chambers, expansion of the gases present in the cathode chambers into the cathode supply path and/or into the cathode exhaust path takes place, preferably into both paths. The expansion can be accomplished in a simple manner by opening the first adjusting means arranged in the cathode supply path and/or the second adjusting means arranged in the cathode exhaust path. A rapid expansion is guaranteed in this manner.

In an alternative embodiment, the expansion of the oxygen-depleted cathode operating gas can be accomplished by leakage flows, meaning in a passive manner. An advantage of this variation is that no active steps and no design measures are necessary.

Opening the adjusting means for expansion of the cathode gases typically takes place for a specified time period that is in the range of from 0.5 to 30 seconds, in particular from 0.5 to 5 seconds. The duration of the expansion is determined depending upon the volume of the fuel cell stack and of the line system that is to be flushed with oxygen-depleted cathode gas. If adjusting means are present in the cathode exhaust path and/or in the cathode supply path, the duration is preferably gauged so that the oxygen-depleted cathode gas floods up to the adjusting means. Alternatively, the expansion continues until a desired pressure is achieved in the system that can extend until ambient pressure is reached. The final pressure is preferably located in a range from the ambient pressure to a slight overpressure, in particular from ambient pressure up to 50 kPa (0.5 bar) overpressure, especially preferably in a range from ambient pressure up to 20 kPa (0.2 bar) overpressure.

Step (c)

After the expansion of the cathode gases, the separation of the cathode chambers from the environment takes place in step (c) in order to prevent a return oxygen diffusion via the supply line. The separation of the cathode chambers from the environment preferably is accomplished by closing the first and/or second adjusting means in the cathode supply path or cathode exhaust path. In this manner, a good separation effect and minimal return oxygen diffusion into the cathode chambers is achieved. If other components are present in the cathode exhaust path or cathode supply path that achieve a specified barrier effect, separate adjusting means may be omitted. It is possible, for example, that the compressor in the cathode supply path ensures a sufficient impermeability when idle. In this case, the second barrier means in the cathode supply path may be omitted. If, on the other hand, a turbine is arranged in the cathode exhaust path that has a certain barrier effect, a special adjusting means may be omitted here, as well.

Before step (a), the fuel cell stack is preferably disconnected from an electrical load, in particular from an electrical consumer operated with energy produced by the fuel cell stack.

The invention further relates to a fuel cell system including a fuel cell stack that has anode chambers and cathode chambers as well as a cathode supply having a cathode supply path for supplying an oxygenated cathode operating gas into the cathode chambers, a compressor arranged in the cathode supply path and a cathode exhaust path for discharging a cathode exhaust gas from the cathode chambers. The fuel cell system is equipped to execute the method according to the invention for switching off the fuel cell system. For this purpose the fuel cell system preferably includes a control that has an appropriate program algorithm for executing the method.

Additional preferred embodiments of the invention arise from the other features stated in the sub-claims.

The various embodiments of the invention mentioned in this application may be combined advantageously with one another unless stated otherwise in individual cases.

Figure 2:
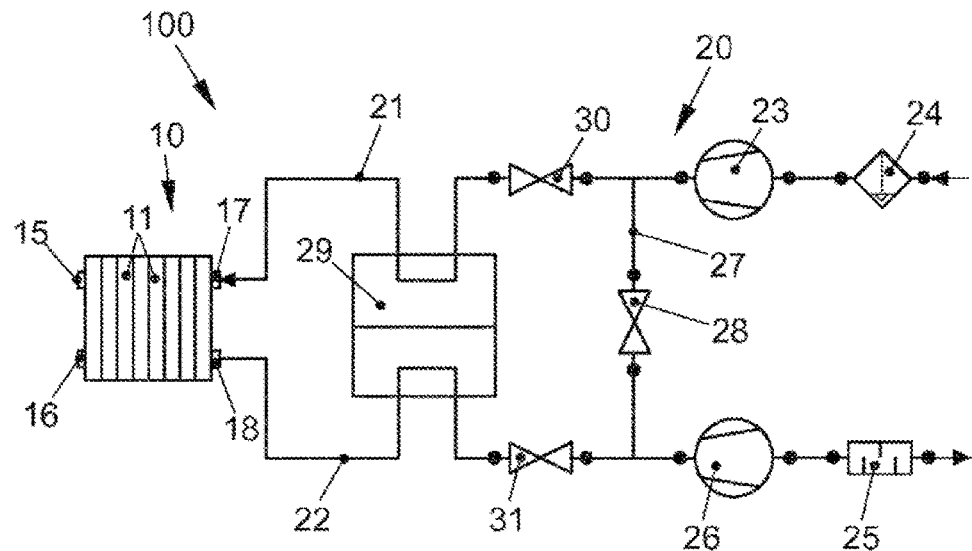
Figure 3:
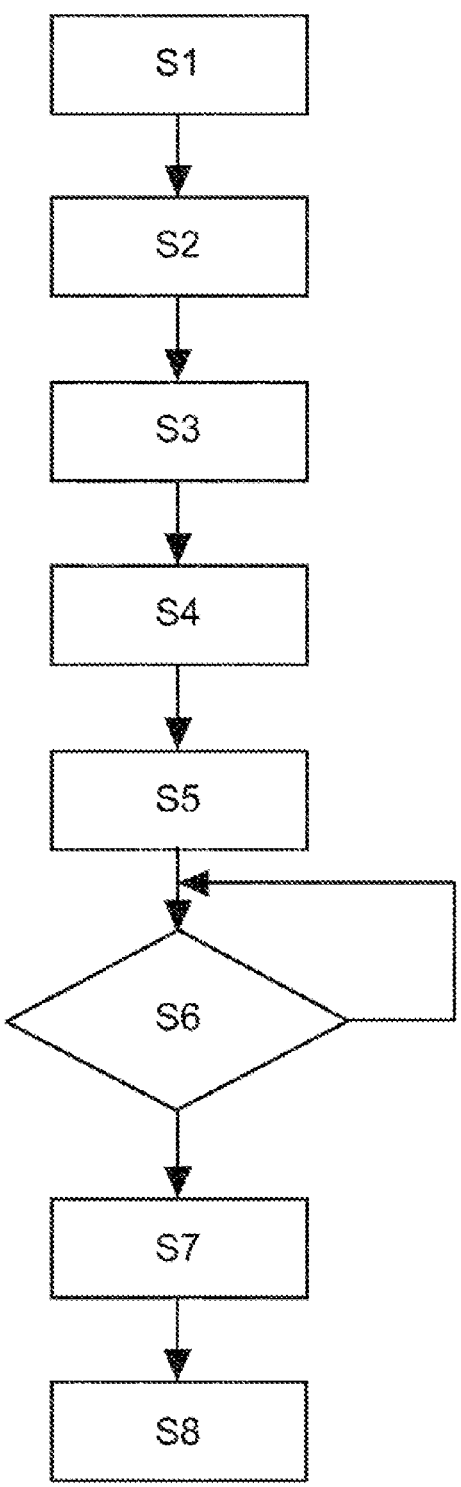
Figure 4:
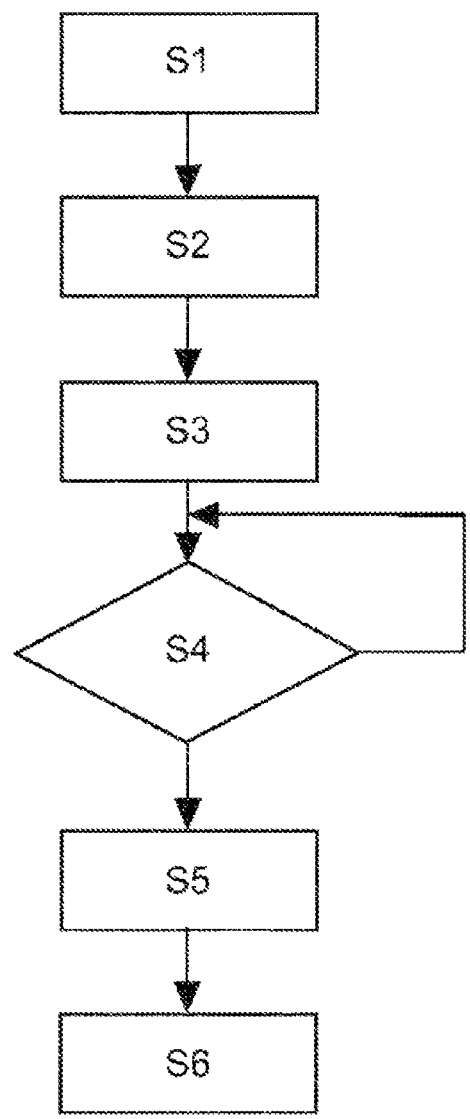

The invention is explained below in exemplary embodiments on the basis of the respective drawings. They show:

FIG. 1 a fuel cell system according to a first embodiment of the invention;

FIG. 2 a fuel cell system according to a second embodiment of the invention;

FIG. 3 flow chart of a method for switching off a fuel cell system according to FIG. 1 or 2 according to a first embodiment of the invention and FIG. 4 flow chart of a method for switching off a fuel cell system according to FIG. 1 or 2 according to a first embodiment of the invention.

FIG. 1 shows a fuel cell system according to the present invention designated overall as 100. Fuel cell system 100 includes a fuel cell stack 10 as a core component. Fuel cell stack 10 has a plurality of individual cells 11, each of which has a cathode chamber 12 as well as an anode chamber 13 that are separated from each other by an ion-conductive polymer electrolyte membrane 14 (see detailed view). The cathode and anode chambers 12, 13 each contain a catalytic electrode that catalyzes a respective partial reaction of the fuel cell conversion (not depicted). Between each two membrane electrode assemblies is additionally arranged a bipolar plate (also not depicted), which serves to supply the operating media in the cathode and anode chambers 12, 13 and also creates the electrical connection between the individual fuel cells 11.

Fuel cell stack 10 features an anode input 15 and an anode output 16 that are connected to an anode supply (not fully depicted). The anode supply includes an anode supply path that connects a fuel storage to anode input 15 and serves to supply an anode operating gas, for example hydrogen, into the anode chambers 13. The anode supply further includes an anode exhaust path that is connected to anode output 16 of stack 10 and discharges anode exhaust gas from anode chambers 13 of fuel cell stack 10 and usually at least partially directs it back into the anode exhaust path via a recirculating line.

In order to supply fuel cell stack 10 with an oxygen-containing cathode operating gas, in particular air, fuel cell system 100 also has a cathode supply 20.

Cathode supply 20 includes a cathode supply path 21 that supplies the cathode supply gas, in particular air, to cathode chambers 12 of fuel cell stack 10 via a cathode input 17. For conveying and compacting the cathode operating gases, a compressor 23, which is preferably powered by electric motor, is arranged in cathode supply path 21. Arranged upstream of compressor 23 is a filter 24, which retains particulate components (dust).

A cathode exhaust path 22 of cathode supply 20 conducts the cathode exhaust gas (exhaust air) out of cathode chambers 12 via a cathode exhaust 18 of fuel cell stack 10 and conducts it to an optional exhaust system 25 that includes, for example, a muffler. As depicted here, compressor 23 can optionally be supported by a turbine 26 that is arranged in cathode exhaust path 22 and is connected to compressor 23 by means of a shaft (not depicted).

A wastegate line 27 branching off from the cathode supply path 21 connects the cathode supply path 21 to the cathode exhaust path 22. The wastegate line 27 serves to bypass the fuel cell stack 10, if the compressed cathode operating gas is not required in the fuel cell stack 10, for example in low-load phases, but the compressor 23 on the other is not to be shut down. An adjusting means 28 may optionally be arranged in the wastegate line 27, which is, for example, designed as a flap or control valve. A mass flow flowing through wastegate line 27 is regulated by adjusting means 28. The output of fuel cell stack 10 can be regulated by constant compressor power output via adjusting means 28.

Cathode supply 20 also has a humidifier 29, which serves to humidify the cathode operating gases in order to supply polymer electrolyte membrane 14 with moisture. Humidifier 29 is preferably a membrane humidifier that separates the cathode operating gas to be humidified from the wet gas using a water vapor-permeable membrane. Water vapor diffuses from the wet gas through the membrane into the cathode operating gas to be humidified. In this example, the cathode waste gas from fuel cell stack 10 is used as wet gas that has a comparatively high water vapor content due to the product water of the fuel cell reaction.

The system depicted in FIG. 1 further includes a first adjusting means 30 arranged in cathode supply path 21, as well as a second adjusting means 31 arranged in cathode exhaust path 22. In the example depicted in FIG. 1, first adjusting means 30 is arranged downstream of humidifier 29 and upstream from cathode input 17 of fuel cell stack 10, while second adjusting means 31 is positioned past cathode output 18 and upstream of humidifier 29.

Various further details of the cathode supply 20 are not shown in the simplified FIG. 1 for reasons of clarity. For example, the cathode supply 20 may comprise a heat exchanger, which serves to preheat the air compressed by the compressor 23. As heat carrier, the warm exhaust air coming from the cathode chambers 12 typically flows through the heat exchanger. In the process, the heat exchanger may be bypassed by means of an appropriate bypass line on the part of both the cathode supply path 21 and the cathode exhaust path 22. A turbine bypass line may furthermore be provided on the part of the cathode exhaust path 22, which bypass line bypasses the turbine 26. Systems without turbine 26 are also known. A water separator may furthermore be installed in the cathode exhaust path 22 in order to condense and drain product water arising from the fuel cell reaction.

FIG. 2 shows a further embodiment of fuel cell system 100 according to the present invention. Corresponding elements are indicated using the same reference characters as in FIG. 1 and are not explained again. The system illustrated in FIG. 2 differs from that described in FIG. 1 in the position of adjusting means 30 and 31. Here, first adjusting means 30 is arranged between compressor 23 and humidifier 29 and second adjusting means 31 between humidifier 29 and turbine 26. In particular, both adjusting means 30 and 31 are positioned between wastegate line 27 and humidifier 29.

The installation locations of adjusting means 30, 31 according to FIG. 1 and according to FIG. 2 can also be combined. For example, first adjusting means 30 can be arranged downstream from humidifier 29 and upstream of cathode input 17, while second adjusting means 31 can be placed downstream from dehumidifier 29 and upstream of wastegate line 27. Conversely, the arrangement of first adjusting means 30 can be provided in cathode supply path 21 downstream from compressor 23 and upstream of humidifier 29 and that of second adjusting means 31 in cathode waste path 22 downstream from cathode output 18 and upstream of humidifier 29.

Furthermore, the arrangement of first and/or second adjusting means 30, 31 can be omitted if components are built into cathode supply or waste lines 21 or 22 that themselves have a barrier effect against the environment. If, for example, compressor 23 has a sufficient barrier effect, first adjusting means 30 can be omitted. If turbine 26 has a sufficient barrier effect, second adjusting means 31 can be omitted.

In normal operation of fuel cell system 100 according to FIG. 1 or 2, the anode operating gas, in particular hydrogen, is supplied via an anode supply (not depicted) to fuel cell stack 10. At the same time, the cathode operating gas, in particular air, is drawn in via cathode supply 20 by the operation of compressor 23, compressed and supplied to fuel cell stack 10. A method according to the present invention applied for switching off fuel cell stack 10 is discussed in exemplary embodiments in reference to the following FIGS. 3 and 4.

According to FIG. 3, the presence of a shutdown condition for fuel cell stack 10 is determined in step S1 (during a normal operation of fuel cell system 100). Then, in step S2, the disconnection of fuel cell stack 10 is effected by an electrical load, meaning by an electrical consumer that is operated by the electrical energy produced by fuel cell stack 10.

In subsequent step S3, second adjusting means 31 arranged in cathode waste path 22 is closed. At the same time, first adjusting means 30 in cathode supply path 21 is opened and wastegate adjusting means 28 is opened or remains open. Compressor 23 continues to operate and transports away the compressed cathode operating medium through opened wastegate line 27 into cathode waste path 22. In this manner, operating pressure in cathode chambers 12 of fuel cell stack 10 is maintained without a flow occurring through cathode chambers 12. From this instant, a consumption of oxygen in the cathode operating gas present in cathode chambers 12 takes place because the latter continues to abreact via the fuel cell reaction, meaning via the reactions with the protons diffusing out of anode chambers 13 through membrane 14. Because fresh operating gas does not flow through cathode chambers 12, the concentration of oxygen begins to decline.

In subsequent step S4, adjusting means 30 in cathode supply path 21 is also closed. Cathode chambers 12 of fuels cell stack 10 are now separated from the environment, wherein the high pressure level of, for example, 150 to 250 kPa (1.5 to 2.5 bar) is, however, maintained. Next, in step S5, compressor 23 is switched off. As a result, the pressure level in cathode exhaust path 22 downstream from adjusting means 31 as well as in wastegate line 27 drops. Cathode chambers 12, however, simultaneously remain at a high pressure level.

In subsequent query step S6, it is verified whether a desired low oxygen level has been reached in cathode chambers 12. For example, the elapse of a predetermined time since the closing of adjusting means 31 in step S3 can be verified by an appropriate counter. Alternately, the residual oxygen concentration in cathode chambers 12 is measured using an appropriate gas sensor. Especially preferred, however, the cell voltage of fuel cell stack 10 is monitored and compared to a lower threshold value. If too high an oxygen concentration is detected in step S6, for example if the cell voltage remains above the threshold value, the method goes back in order to again arrive at query S6 after a pause. If, however, a sufficiently low oxygen concentration is detected in cathode chambers 12 in step S6, the method continues to step S7.

In step S7, first and second adjusting means 30, 31 are opened in a controlled manner. As a result, the oxygen-depleted cathode gas flows through cathode supply path 21 and cathode exhaust path 22 in the direction of humidifier 29 or, in the example from FIG. 2, through humidifier 29. The expansion of oxygen-depleted cathode gas lowers the concentration of oxygen per unit volume. At the same time, flooding the line system of cathode supply 20 causes an expansion of the gas volume that has been rendered inert. Adjusting means 30, 31 preferably remain open until the oxygen-depleted gas has flowed through at least to the installation position of adjusting means 30, 31. Optionally, the duration of the opening of adjustment means 30, 31 can be monitored by determining the pressure present in cathode chambers 12, wherein a final pressure can be specified that is between the initial pressure and the ambient pressure, preferably with a slight overpressure.

Finally, adjusting means 30 and 31 are again closed in step S8. In this manner, cathode chambers 12 of fuel cell stack 10 are again separated from the environment, wherein the low pressure level present in cathode chambers 12, for example ambient pressure or slight overpressure, is maintained. The switching off process is ended with step S8.

An additional embodiment of the method according to the invention for switching off a fuel cell system is shown in FIG. 4. Steps S1 to S3 correspond to those from FIG. 3.

The method begins as for step S1 shown in FIG. 3 with the determination of a shutdown condition and continues to step S2 to disconnect the electrical load from fuel cell stack 10. Adjusting means 31 arranged in cathode exhaust path 22 is then closed in step S3, while compressor 23 continues to deliver the compressed supply gas through opened wastegate line 27 and simultaneously maintains the pressure in cathode chambers 12, but without passing through them.

The condition established in step S3 (operation of compressor 23 while adjusting means 31 is closed) is maintained until a desired low oxygen level is reached in cathode chambers 12. This is verified in step S4 using one of the methods discussed in connection with step S6 of FIG. 3. If it is determined in step S4 that a sufficiently low oxygen concentration has not been reached in cathode chambers 12 of fuel cell stack 10, the method goes back through a delay step to cycle through query S4 again. If, however, it is determined in step S4 that a sufficiently low oxygen concentration has been reached, for example by reaching or falling below a lower threshold value for cell voltage, the method then continues to step S5.

The compressor 23 is switched off in step S5. As a result, a small portion of the oxygen-depleted gas flows from cathode chambers 12 back in the direction of adjusting means 30 and compressor 23. An expansion of oxygen-depleted gas then takes place through cathode supply path 21.

In step S6, adjusting means 30 in cathode supply path 21 is next closed in order to separate cathode chambers 12 from the environment via a low pressure level.

Both strategies for switching off fuel cell system 100 described on the basis of FIGS. 3 and 4 achieve the aim that cathode chambers 12 are impinged by a gas mixture that has been rendered inert by oxygen depletion, not only in the operational area, but also in their supply areas of fuel cell stack 10, as well as, beyond that, into the line system area of cathode supply 20. After fuel cell system 100 switches off, fuel cell stack 10 is thus protected over a long period before oxygen can reach fuel cell stack 10 because of leakage. In this manner, an air-air restart is avoided, even after long deactivation time. As a result, the service life of the system is extended.

LIST OF REFERENCE SYMBOLS

100 Fuel cell system
10 Fuel cell stack
11 Single cell
12 Cathode chamber
13 Anode chamber
14 Polymer electrolyte membrane
15 Anode input
16 Anode output
17 Cathode input
18 Cathode output
20 Cathode supply
21 Cathode supply path
22 Cathode exhaust path
23 Compressor
24 Filter
25 Exhaust system
26 Turbine
27 Wastegate line
28 Wastegate line
29 Humidifier
30 Adjusting means
31 Adjusting means

The invention claimed is:

1. A method, comprising:
switching off a fuel cell system, the switching off including: maintaining cathode chambers of a fuel cell stack under excess pressure;
preventing a flow of an oxygenated cathode operating gas from a cathode supply to the cathode chambers, the cathode supply coupled to the cathode chambers by a cathode supply path;
producing oxygen-depleted cathode operating gas by allowing the oxygenated cathode operating gas in the cathode chambers to be oxygen-depleted;
expanding of the oxygen-depleted cathode operating gas in the cathode chambers by opening a first adjusting component in the cathode supply path or a second adjusting component in a cathode exhaust path, the cathode exhaust path coupled to the cathode chambers; and
separating the cathode chambers from an environment by blocking the cathode supply path and the cathode exhaust path.

2. The method according to claim 1, wherein separating the cathode chambers from the environment includes closing a first adjusting component in the cathode supply path or a second adjusting component in the cathode exhaust path.

3. The method according to claim 1, wherein allowing the oxygenated cathode operating gas in the cathode chambers includes a reaction of oxygen with fuel from anode chambers of the fuel cell stack or with fuel introduced into the cathode chambers.

4. The method according to claim 1, wherein maintaining the cathode chambers of the fuel cell stack under excess pressure includes maintaining a combustible atmosphere in anode chambers of the fuel cell stack.

5. The method according to claim 1, further comprising disconnecting the fuel cell stack from an electrical load prior to maintaining the cathode chambers of the fuel cell stack under excess pressure.

6. The method according to claim 1, wherein maintaining the cathode chambers of the fuel cell stack under excess pressure includes separating the cathode chambers from the environment by blocking the cathode supply path and the cathode exhaust path.

7. The method according to claim 6, wherein separating the cathode chambers from the environment includes closing of the first adjusting component in the cathode supply path or the second adjusting component in the cathode exhaust path.

8. A fuel cell system, comprising:
a fuel cell stack including anode chambers and cathode chambers;
a cathode supply including:
a cathode supply path configured to supply an oxygenated cathode operating gas into the cathode chambers, the cathode supply path includes a first adjusting component; and a compressor in the cathode supply path;
a cathode exhaust path configured to discharge cathode exhaust from the cathode chambers, the cathode exhaust path includes a second adjusting component;
a controller that in operation:
maintains the cathode chambers under excess pressure;
prevents a flow of an oxygenated cathode operating gas from the cathode supply to the cathode chambers;
produces oxygen-depleted cathode operating gas by allowing the oxygenated cathode operating gas in the cathode chambers to be oxygen-depleted; and
opens the first adjusting component in the cathode supply path or the second adjusting component in the cathode exhaust path.

9. The fuel cell system of claim 8, wherein the cathode supply includes a wastegate line that branches from the cathode supply path downstream from the compressor and is configured to discharge into the cathode exhaust path.

10. The method according to claim 7, wherein maintaining the cathode chambers of the fuel cell stack under excess pressure includes:
closing the second adjusting component while a compressor in the cathode supply path is operating; and
closing the first adjusting component.

11. The method according to claim 7, wherein the cathode supply includes a wastegate line that branches from the cathode supply path downstream from the compressor and discharges into the cathode exhaust path, wherein the wastegate line is open while the compressor is operating.

12. A method, comprising:
maintaining excess pressure in cathode chambers of a fuel cell stack;
blocking a flow of an oxygenated cathode operating gas in a cathode supply path, the cathode chambers coupled to a cathode supply by the cathode supply path;
producing oxygen-depleted cathode operating gas by depleting the oxygenated cathode operating gas in the cathode chambers of oxygen;
expanding of the oxygen-depleted cathode operating gas in the cathode chambers via the cathode supply path or a cathode exhaust path, the cathode exhaust path coupled to the cathode chambers; and
blocking the cathode supply path and the cathode exhaust path.

13. The method according to claim 12, wherein expanding the oxygen-depleted cathode operating gas in the cathode chambers includes opening a first adjusting component in the cathode supply path or a second adjusting component in the cathode exhaust path.

14. The method according to claim 12, wherein a combustible atmosphere is maintained in anode chambers of the fuel cell stack while maintaining excess pressure in the cathode chambers of the fuel cell stack.

15. The method according to claim 12, wherein blocking the flow of the oxygenated cathode operating gas in the cathode supply path, includes closing of a first adjusting component arranged in the cathode supply path or a second adjusting component arranged in the cathode exhaust path.

16. The method according to claim 15, wherein maintaining excess pressure in the cathode chambers of the fuel cell stack includes:
closing the second adjusting component while a compressor in the cathode supply path is operating; and
closing the first adjusting component.

17. A method, comprising:
switching off a fuel cell system, the switching off including: maintaining cathode chambers of a fuel cell stack under excess pressure, the maintaining including separating the cathode chambers from an environment by blocking a cathode supply path and a cathode exhaust path, the cathode supply path including a wastegate line that branches from the cathode supply path downstream from a compressor and discharges into the cathode exhaust path, the wastegate line being open while the compressor is operating;
preventing a flow of an oxygenated cathode operating gas from the cathode supply to the cathode chambers, the cathode supply coupled to the cathode chambers by the cathode supply path;
producing oxygen-depleted cathode operating gas by allowing the oxygenated cathode operating gas in the cathode chambers to be oxygen-depleted;
expanding of the oxygen-depleted cathode operating gas in the cathode chambers by opening a first adjusting component in the cathode supply path or a second adjusting component in the cathode exhaust path, the cathode exhaust path coupled to the cathode chambers; and
after expanding of the oxygen-depleted cathode operating gas, separating the cathode chambers from the environment by blocking the cathode supply path and the cathode exhaust path, the separating including closing of the first adjusting component in the cathode supply path or the second adjusting component in the cathode exhaust path.

18. The method of claim 17, comprising maintaining a combustible atmosphere in anode chambers of the fuel cell stack while maintaining excess pressure in the cathode chambers of the fuel cell stack.

* * * * *

UNITED STATES PATENT AND TRADEMARK OFFICE
CERTIFICATE OF CORRECTION

PATENT NO. : 10,243,224 B2
APPLICATION NO. : 15/531358
DATED : March 26, 2019
INVENTOR(S) : Torsten Schwarz et al.

It is certified that error appears in the above-identified patent and that said Letters Patent is hereby corrected as shown below:

In the Claims

Column 12, Claim 17, Line 27:
"supply to" should read --supply path to--.

Column 12, Claim 17, Line 28:
"supply coupled" should read --supply path coupled--.

Signed and Sealed this
Twenty-sixth Day of November, 2019

Andrei Iancu
*Director of the United States Patent and Trademark Office*